United States Patent [19]
Nishioka et al.

[11] Patent Number: 4,880,975
[45] Date of Patent: Nov. 14, 1989

[54] FINE ADJUSTMENT MECHANISM FOR A SCANNING TUNNELING MICROSCOPE

[75] Inventors: Tadashi Nishioka; Takao Yasue; Hiroshi Koyama, all of Itami, Japan

[73] Assignee: Mitsubishi Denki Kabushiki Kaisha, Japan

[21] Appl. No.: 229,981

[22] Filed: Aug. 9, 1988

[30] Foreign Application Priority Data

Apr. 22, 1988 [JP] Japan .................................. 63-98230

[51] Int. Cl.$^4$ .............................................. H01J 37/04
[52] U.S. Cl. .................................. 250/306; 250/423 F
[58] Field of Search ............................. 250/306, 423 F

[56] References Cited

U.S. PATENT DOCUMENTS 4,785,177 11/1988 Besocke .............................. 250/306

OTHER PUBLICATIONS

Binnig et al., "Single-Tube Three-Dimensional Scanner for Scanning Tunneling Microscopy" Rev. Sci. Instrm., vol. 57, pp. 1688–1699 (1986).
K. Besocke, "An Easily Operable Scanning Tunneling Microscope" Surface Science, vol. 181, pp. 145–153 (1987).

Primary Examiner—Bruce C. Anderson
Attorney, Agent, or Firm—Leydig, Voit & Mayer

[57] ABSTRACT

A fine adjustment mechanism for a scanning tunneling microscope includes a mounting member, a cylindrical piezoelectric element fixed to the mounting member at one end thereof, an electrode provided on each of the inner and outer walls of the piezoelectric element, a probe provided on the other end of the piezoelectric element in such a manner that it extends outward on the central axis of the piezoelectric element, an electrically conductive member provided on the central axis of the piezoelectric element, one end of the conductive member being electrically connected to the probe within the piezoelectric element and the other end thereof extending to the outside of the piezoelectric element through the side of the piezoelectric element at which it is fixed to the mounting member, and shielding member provided on the outer periphery of the conductive member for electrically shielding the conductive member.

14 Claims, 8 Drawing Sheets

FINE ADJUSTMENT MECHANISM FOR A SCANNING TUNNELING MICROSCOPE

BACKGROUND OF THE INVENTION

1. Field of the Invention

The present invention relates to a fine adjustment mechanism for a scanning tunneling microscope (hereinafter referred to as an STM), and, more particularly, to a three-dimentional fine adjustment mechanism which employs a cylindrical piezoelectric element.

2. Description of the Related Art

Generally, STMs include a combination of a coarse adjustment mechanism and a fine adjustment mechanism, the coarse adjustment mechanism being adapted to hold a sample to be observed and the fine adjustment mechanism having a probe. In such STMs, after the sample has been advanced by the coarse adjustment mechanism to the vicinity of the forward end of the probe, the probe is moved towards the sample by the fine adjustment mechanism while a voltage is being applied between the sample and the probe, until a tunnel current having a predetermined magnitude flows therebetween. Subsequently, the probe is moved along the surface of the sample by the fine adjustment mechanism, so as to detect irregularities on the surface of the sample on an atomic scale utilizing variations in the tunnel current.

The fine adjustment mechanisms for use in these STMs in general employ a cylindrical piezoelectric element, such fine adjustment mechanisms being disclosed, for example, from Page 1688 to 1689 of Rev. Sci. Instrum., Vol. 57 (1986) by G. Binnig and D. P. E. Smith and from Page 145 to 153 of Surface Science, Vol. 181 (1987) by K. Besocke.

In any of these fine adjustment mechanisms, the one end of a cylinder which comprises a piezoelectric element is mechanically fixed to a fine adjustment mounting member, and the other end thereof is provided with a probe. The inner and outer walls of the cylinder are provided with electrodes. When a voltage is applied to these electrodes, mechanical deformity occurs on the piezoelectric element, by means of which the probe is finely adjusted.

The tunnel current that flows between the probe and the sample is picked out through a conductor wire connected to the probe, and is measured by a measuring device.

However, since the tunnel current is at an extremely small level, it is susceptible to variations in the voltage applied to the electrodes of the piezoelectric element and the electrical noises from the outside of the fine adjustment mechanism, making it difficult for the tunnel current to be output at an accurate value.

SUMMARY OF THE INVENTION

In view of the above-described problem of the conventional art, an object of the present invention is to provide a fine adjustment mechanism for an STM which makes the tunnel current less susceptible to variations in the voltage applied to the electrodes of a piezoelectric element and the electrical noises from the outside of the fine adjustment mechanism so that it can be output at an accurate value.

To this end, the present invention provides a fine adjustment mechanism for an STM which comprises:

a mounting member;

a cylindrical piezoelectric element fixed to the mounting member at one end thereof;

an electrode means provided on each of the inner and outer walls of the piezoelectric element;

a probe provided on the other end of the piezoelectric element in such a manner that it extends outwardly on the central axis of the piezoelectric element;

a electrically conductive member provided on the central axis of the piezoelectric element, one end of the conductive member being electrically connected to the probe within the piezoelectric element and the other end thereof extending to the outside of the piezoelectric element through the side of the piezoelectric element at which it is fixed to the mounting member; and a shielding means provided on the outer periphery of the conductive member for electrically shielding the conductive member.

In the present invention, the conductive member connected to the probe passes through the interior of the cylindrical piezoelectric element on the central axis thereof, and is led to the outside of the fine adjustment mechanism. The conductive member is electrically shielded by the shielding means formed on the outer periphery thereof.

DETAILED DESCRIPTION OF THE PREFERRED EMBODIMENTS

A first embodiment of the present invention will be described below with reference to the accompanying drawings.

Figure 1:
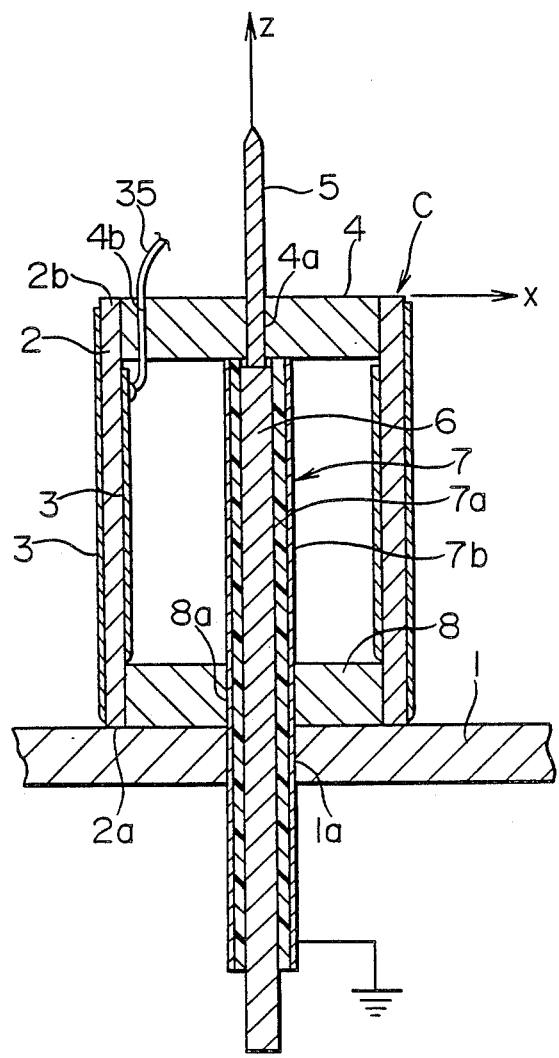
FIG. 1 is a cross-sectional view of a fine adjustment mechanism for an STM, showing a first embodiment of the present invention.

Referring first to FIG. 1, one end 2a of a piezoelectric element 2 which forms a cylinder C is fixed to a flat-plate mounting member 1 using, for example, an epoxy resin type adhesive. The inner and outer walls of the piezoelectric element 2 are provided with an electrode 3.

Figure 2:
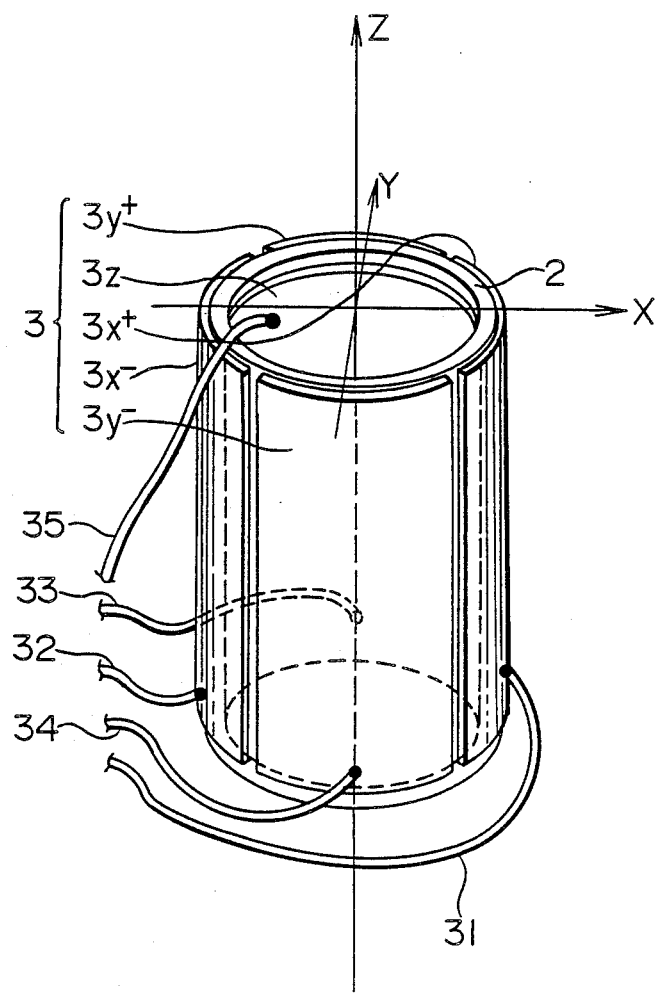
FIG. 2 is a perspective view of a piezoelectric element and an electrode means of the first embodiment.

The electrode 3 is made of silver or nickel. It comprises four electrodes $3x^+$, $3x^-$, $3y^+$, $3y^-$ provided on the outer periphery of the cylinder C, these electrodes being divided along the periphery of the cylinder, and an electrode $3z$ formed on the entirety of the inner periphery of the cylinder C, as shown in FIG. 2. In FIG. 2, the electrodes $3x^+$ and $3x^-$ are located in such a manner as to face each other on the X axis, and the electrodes $3y^+$ and $3y^-$ are positioned such that they face each other on the Y axis. Lead wires 31 to 35 are connected to the electrodes $3x+$, $3x-$, $3y+$, $3y-$, and $3z$, respectively. In addition, the piezoelectric element 2 is formed of, for example, lead zirconate-titanate (Pb (Zr-Ti)O$_3$), and is polarized such that the electric field thereof is in the direction of the normal line of the side surface of the cylinder C and that it is distorted in the direction of the central axis (the Z axis).

Figure 3:
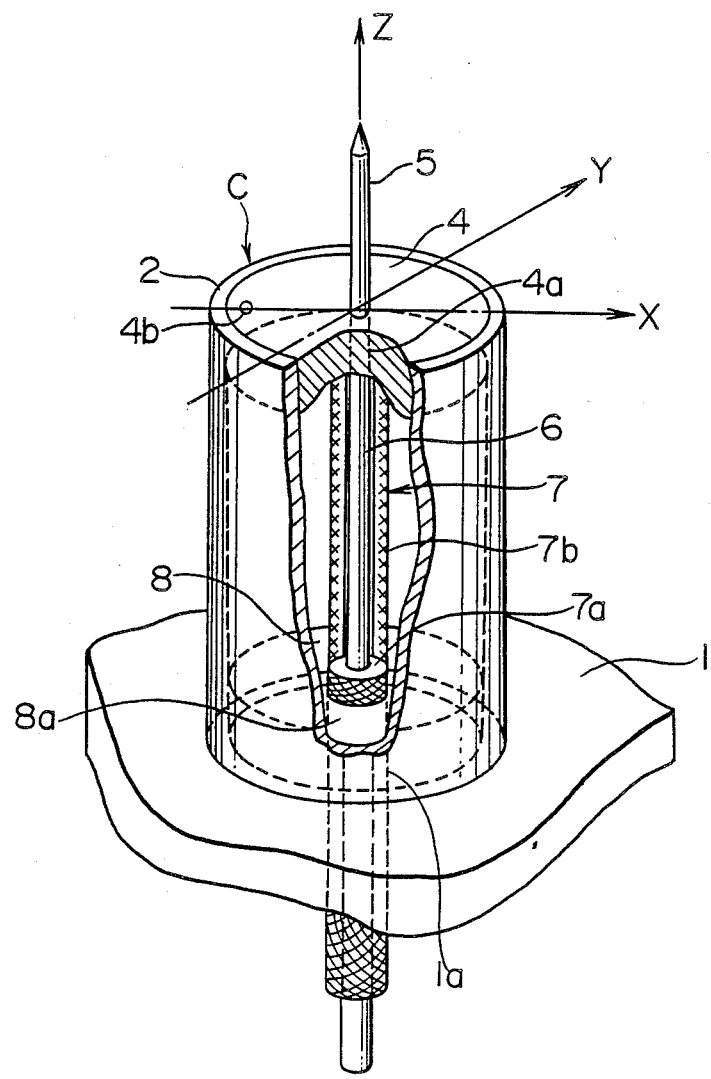
FIG. 3 is a schematic view, with portions broken away for clarity, of the first embodiment.

As shown in FIGS. 1 and 3, a probe retaining member 4 having a disk-like shape is fitted to the other end 2b of the cylindrical piezoelectric element 2, by which the cylinder C is closed. The probe retaining member 4 is mainly made of an electrically insulating material such as a ceramic, and is fixed to the inner wall of the cylinder C using an electrically insulating epoxy resin type adhesive. The probe retaining member 4 is provided with a through-hole 4a which is disposed on the central axis of the cylinder C (on the Z axis). A probe 5 is passed through the through-hole 4a. Further, the periphery of the probe retaining member 4 is provided with a through-hole 4b, through which the lead wire 35 connected to the electrode 3z formed on the inner wall of the cylinder C is led to the outside of the cylinder C.

The probe 5 is a wire having a diameter of 0.25 mm whose forward end is machined to be sharpened. The wire may be made of tungsten (W) or an alloy of platinum and iridium (Pt-Ir). The forward end of the probe 5 extends outward from the probe retaining member 4 in the direction of the Z axis. On the other hand, the rear end of the probe 5, after having passed through the through-hole 4a, projects a short distance into the interior of the cylinder C, and the one end of a conductor 6 which is made of copper and which serves as an electrically conductive member is electrically connected to the rear portion of the probe 5. The conductor 6 is disposed on the central axis (Z axis) of the cylinder C. The other end of the conductor 6 is passed through a through-hole 1a provided in the mounting member 1, and is led to the outside of the cylinder C.

The outer periphery of the conductor 6 is provided with a shielding means 7. The shielding means 7 comprises an insulator 7a such as polyethylene which surrounds the conductor 6, and an external conductor 7b which is an annealed copper wire braid provided on the outer periphery of the insulator 7a. The shielding means 7, togther with the conductor 6, passes through the through-hole 1a of the mounting member 1, and is led to the outside of the cylinder C. In addition, the external conductor 7b is grounded outside of the cylinder C.

A conductor retaining member 8 having a disk-like shape is fitted to the end 2a of the piezoelectric element 2 at which it is fixed to the mounting member 1. The conductor retaining member 8 is mainly made of an electrically insulating material such as a ceramic, and is fixed to the inner wall of the cylinder C as well as to the mounting member 1 using an electrically insulating epoxy resin type adhesive. The conductor retaining member 8 is provided with a through-hole 8a which is positioned on the central axis (Z axis) of the cylinder C, and through which the conductor 6 and the shielding means 7 are fixedly passed.

Preferably, the mounting member 1 is made of a good conductor having a small coefficient of thermal expansion, such as invar (Fe 64%—Ni 36%).

As has been stated, the piezoelectric element 2 is polarized so that the electric field is directed in the direction of the normal line of the side surface of the cylinder C and that it is distorted in the direction of the central axis (Z axis) of the cylinder C. Therefore, when the four electrodes $3x+$, $3x-$, $3y+$, and $3y-$ provided on the outer periphery of the cylinder C are grounded to zero while voltages $\pm V$ are applied to the electrode $3z$ provided on the inner periphery of the cylinder C, the piezoelectric element 2 is expanded and contracted in the direction of the Z axis by a displacement $\delta$ expressed as follows:

$$\delta = \pm d \times (L/W) \times V$$

where d represents the piezoelectric distortion constant of the piezoelectric element 2, L represents the length of the cylinder C, and W represents the wall thickness of the cylinder C.

Further, when the voltages $\pm V$ having opposite polarities are respectively applied to the pair of electrodes $3y+$ and $3y-$ provided on the outer periphery of the cylinder C while the pair of electrodes $3x+$ and $3x-$ provided on the outer periphery of the cylinder C and the electrode $3z$ provided on the inner periphery of the cylinder C are grounded, the piezoelectric material located between the electrode $3y+$ and the electrode $3z$ and the piezoelectric material located between the electrode $3y-$ and the electrode $3z$ are respectively expanded and contracted in the opposite directions, and the cylinder C is thereby curved in the Y-Z plane.

Similarly, when the voltages $\pm V$ having opposite polarities are respectively applied to the pair of electrodes $3x+$ and $3x-$ while the pair of electrodes $3y+$ and $3y-$ and the electrode $3z$ are grounded, the cylinder C is curved in the X-Z plane.

Thus, the probe 5 mounted on the other end 2b of the piezoelectric element 2 is three-dimensionally moved by adjusting the voltages applied to the electrode 3.

Figure 4:
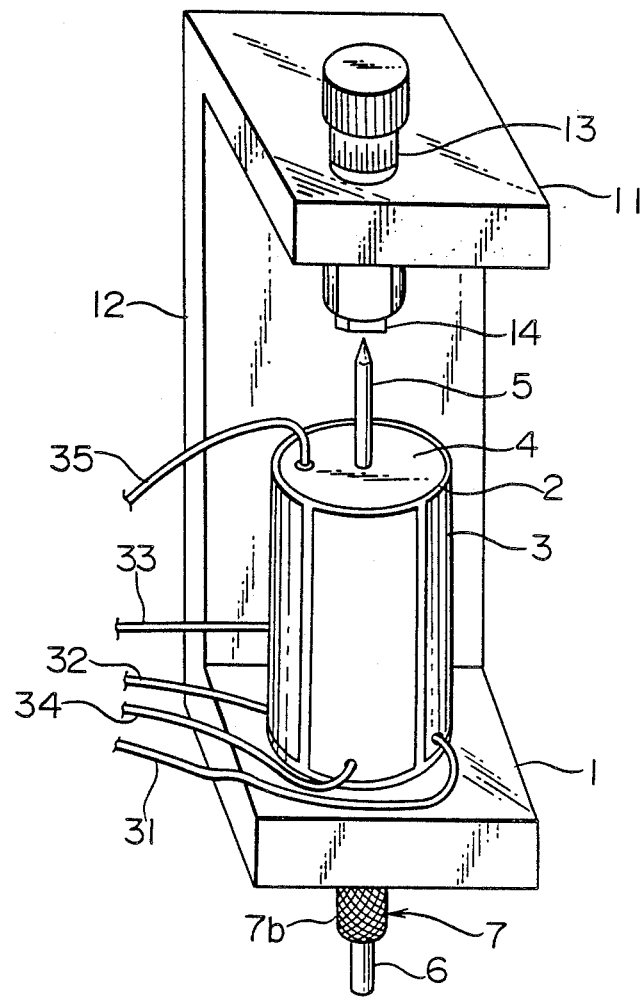
FIG. 4 is a perspective view of an STM employing the first embodiment.

Next, the example of an STM constructed by a combination of the fine adjustment mechanism of the first embodiment and a coarse adjustment mechanism will be described below with reference to FIG. 4.

A coarse adjustment mechanism fixing portion 11 is disposed parallel to and in such a manner as to face the plate-shaped mounting member 1 of the fine adjustment mechanism. The mounting member 1 and the coarse adjustment mechanism fixing portion 11 are connected by a connecting portion 12. The piezoelectric element 2 of the fine adjustment mechanism is fixed to the mounting member 1 in such a manner that it faces the coarse adjustment mechanism fixing portion 11. A differential micrometer 13 which serves as a coarse adjustment mechanism is provided on the coarse adjustment mechanism fixing portion 11 in such a manner that the operating portion thereof faces the probe 5 of the fine adjustment mechanism. A sample 14 is mounted on the operating portion of the differential micrometer 13 in such a manner that it faces the forward end of the probe 5.

The coarse adjustment mechanism fixing portion 11 and the connecting portion 12 are formed of a good conductor such as invar, like the mounting member 1 of the fine adjustment mechanism. The differential micrometer 13 is also made of a conductor such as a metal. The differential micrometer 13 is electrically connected to the coarse adjustment mechanism fixing portion 11 through contact, and this results in the electrical connection of the mounting member 1 of the fine adjustment mechanism with the sample 14.

The lead wires 31 to 35 connected to the electrode 3 are connected to a voltage applying device (not shown), and the mounting member 1 and the conductor 6 are electrically connected to a tunnel current measuring device (not shown).

The operation of this embodiment will now be described.

First, the mounting member 1 and the external conductor 7b of the shielding means 7 are grounded. At that time, the probe 5 and the conductor 6 are insulated from the mounting member 1 and the sample 14 by the probe retaining member 4 and the insulator 7a of the shielding means 7.

Next, the sample 14 is moved towards to the probe 5 by the differential micrometer 13 until the distance between the sample and the forward end of the probe 5 becomes about 10 nm. Thereafter, the cylinder C is curved in the X-Z plane and in the Y-Z plane by respectively applying a pair of saw tooth wave voltages having the same magnitude and the opposite polarities to the electrode pair $3x^+$ and $3x^-$ and the electrode pair $3y^+$ and $3y^-$ provided on the outer periphery of the piezoelectric element 2, by which the forward end of the probe 5 is two-dimensionally moved in the X-Y plane along the surface of the sample. At that time, since the eectrodes $3x^+$ and $3x^-$ and the electrodes $3y^+$ and $3y^-$ are respectively symmetrical with respect to the Z axis at which the probe 5 is positioned, the effect of the electrostatic induction that occurs in the probe 5 due to the voltages applied to the electrode is reduced.

In this state, a d.c. voltage of about 100 mV is applied between the mounting member 1 and the conductor 6, i.e., between the sample 14 and the probe 5, by the tunnel current measuring device (not shown), whereupon the supervision of the tunnel current through the conductor 6 is started.

Further, a d.c. voltage Vz is applied to the electrode 3z provided on the inner periphery of the piezoelectric element 2 whereby the element 2 is expanded, and the forward end of the probe 5 is advanced towards the surface of the sample 14 while the value of the voltage Vz is being increased, until the measured tunnel current value becomes the set value (for example, 1 nA).

During this time, as the forward end of the probe 5 is being two-dimensionally moved along the surface of the sample 14 by the application of the saw tooth wave voltages to the electrodes $3x^+$, $3x^-$, $3y^+$, and $3y^-$, as has been stated, the irregularities on the surface of the sample 14 immediately deviate the tunnel current from the set value.

Therefore, control of the tunnel current is conducted by employing, for example, constant-current feed-back method (disclosed from page 1573 to page 1576 of Rev. Sci. Instrum., Vol. 56, 1985, by G. F. A. van de Walle, J. W. Gerritsen, H. van Kempen, and P. Wyder). In this method, an error voltage dVz proportionate to the difference (error current) between the actually measured tunnel current and the set value, in addition to the d.c. voltage Vz, is applied to the electrode 3z, so as to finely adjust the probe 5 in the direction of the Z axis such that the error current becomes zero. In this way, the tunnel current can be maintained at the set value despite the presence of irregularities on the surface of the sample 14.

At that time, observation of the surface of the sample 14 on an atomic scale is possible, by the error voltage dVz applied to the d.c. voltage Vz being displayed by, for example, a CRT (not shown) in such a manner that the application of the error voltage is synchronized to the two-dimensional movement of the forward end of the probe 5.

In this embodiment, the conductor 6 through which the tunnel current flows is led to the outside of the cylinder C which constitutes the piezoelectric element 2. At the same time, it is electrically shielded by the shielding means 7. In consequence, even when the amplitude variations and the frequency bandwidths of the voltages applied to the electrode 3 and those of the error voltage dVz applied to the electrode 3z are large, they do not affect the conductor 6, whereby accurate measurement of the tunnel current is possible.

Further, the one end 2a of the cylinder C of the piezoelectrical element 2 is fixed to the mounting member 1 by a strong adhesive made of, for example, epoxy resin. Therefore, the error voltage dVz corresponding to the irregularities on the surface of the sample 14 are converted with a high derree of accuracy into mechanical displacement of the probe 5 mounted on the other end 2b of the cylinder C.

Still further, if the coarse adjustment mechanism fixing portion 11 and the connecting portion 12 are made of a material having a small coefficient of thermal expansion such as invar, variations in the distance between the forward end of the probe 5 and the surface of the sample 14 due to the ambient temperature during the operation of the STM can be suppressed, making a stable observation possible.

Figure 5:
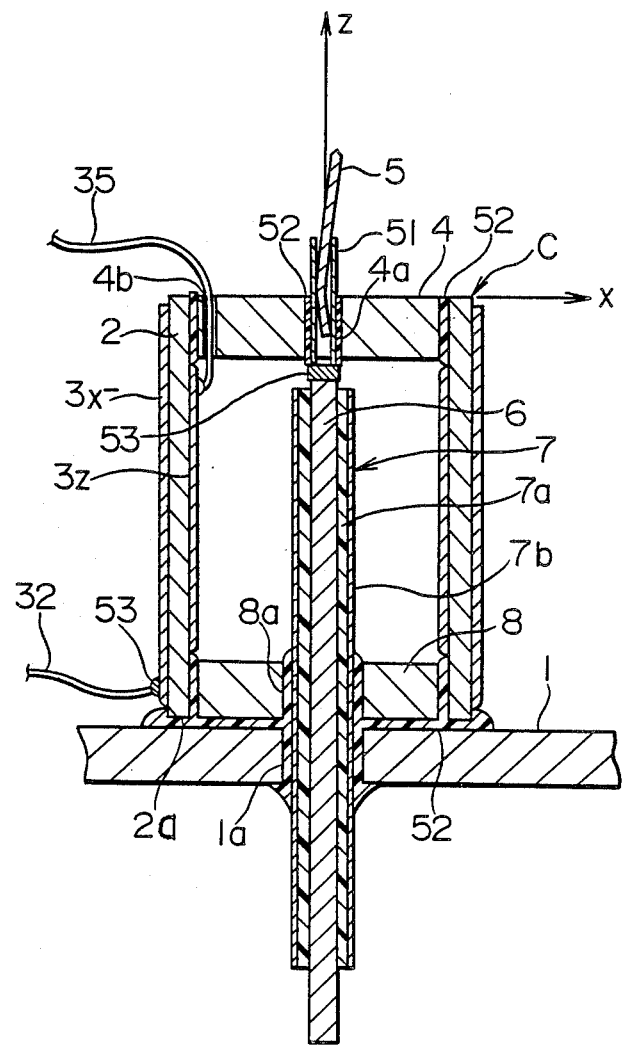
FIG. 5 is a cross-sectional view of a second embodiment of the present invention.

A second embodiment of the present invention will be descibed below with reference to FIG. 5. In this embodiment, a straight small tube 51 made of a conductor such as a metal is inserted in and is fixed to the through-hole 4a 383 formed in the probe retaining member 4 by an adhesive 52. The forward end of the small tube 51 extends outward from the probe retaining member 4 in the direction of the Z axis, and the rear end thereof projects a small distance into the interior of the cylinder C, to which one end of the conductor 6 is elecrically connected by solder 53. The probe 5 is detachably received by the small tube 51. The probe 5 and the small tube 51 are electrically connected to each other through mechanical contact. Therefore, if the probe 5 is inserted in the small tube 51 with the inserted portion of the probe slightly bent beforehand, the elasticity of the probe 5 provides reliable electrical connection between the probe 5 and the small tube 51.

This arrangement of the second embodiment facilitates the replacement of a probe 5, which has a damaged forward end due to the use thereof with a new one.

The materials and dimensions of the components of the fine adjustment mechanism in the second embodiment will now be described in detail.

The piezoelectric element 2 is made of a solid solution of lead titanate ($PbTiO_3$) which is a ferroelectric substance and lead zirconate ($PbZrO_3$) which is antiferroelectric, the lead titanate and lead zirconate being mixed in an appropriate proportion determined so that the resultant solid solution has a suitable Curie temperature, creep characteristics, hysteresis characteristics, and piezoelectric distortion constant which ensure that the resultant piezoelectric element is stable to variations in the ambient environment and has a voltage sensitivity which produces a suitable mechanical displacement. The dimensions of the piezoelectric element 2 are determined in connection with the piezoelectric distortion constant such that a suitable mechanical displacement is provided. For example, lead zirconate-titanate (Pb(Zr-Ti)$O_3$) having a piezoelectric distortion constant of $-300 \times 10^{-12}$ m/V and a Curie temperature of about 200° C. may be formed into a cylinder having an inner diameter of 10 mm, an outer diameter of 12 mm, a thickness of 1 mm, and a length of 12 mm, and the obtained element may be used at a voltage sensitivity of about 30 Å/V (=3 nm/V) in each of the X, Y, and Z directions.

The electrode 3 may be formed on the surfaces of the cylinder C which constitutes the piezoelectric element 2 to a thickness of about 3 μm by the baking of silver or by means of the electroless deposition of nickel. The electrodes $3x+$, $3x-$, $3y+$, and $3y-$ formed on the outer periphery of the cylinder C may be separated from each other by spacing of 1 mm. Each of the lead wires 31 to 35 may be a copper wire having a diameter of 0.2 mm, and be connected to the corresponding electrode using solder 53 containing neutral resin.

The probe 5 may be a wire having a diameter of 0.25 mm which is made of tungsten (W) or platinum-iridium alloy (Pt 90%—Ir 10%) and whose forward end is sharpened by machining or electrolytical polishing.

The probe retaining member 4 and the conductor retaining member 8 may be made of an electrically insulating ceramic such as fused quartz ($SiO_2$) or macor. These members are fixed to the piezoelectric element 2 by the adhesive 52.

The adhesive 52 may be made from a thixotropic epoxy resin which is capable of preventing dropping, and an aromatic amine type curing agent.

The conductor 6 may be an annealed copper wire having a diameter of 0.5 mm. One end of the conductor 6 is connected to the small tube 51 by the solder 53 containing neutral resin. The shielding means 7 comprises an insulator 7a which is made of polyethylene or expanded polyethylene and which is provided on the outer periphery of the conductor 6, and the external conductor 7b which is an annealed copper wire braid and provided on the conductor through the insulator 7a. It has a predetermined characteristic impedance. For example, an insulator 7a made of polyethylene having a thickness of 1.25 mm and an outer diameter of 3 mm, as well as an external conductor 7b which is formed of an annealed copper wire braid consisting of $9 \times 16$ strands braided by a pitch of 36 mm or less, each strand having a diameter of 0.14 mm, may be employed to form a shielding means 7 having a characteristic impedance of 500 ohms. When the external conductor 7b of such a shielding means 7 is grounded, the conductor 6 is electrically shielded from the electrical induction, enabling a very small amount of tunnel current, e.g., 1 nA of tunnel current, to flow through the conductor 6 without being affected by the external circuit. Further, since the shielding means 7 has a constant characteristic impedance, if the conductor 6 is connected to an external circuit, e.g., a differential amplifier, having the same characteristic impedance as that of th shielding means 7, electrical matching is obtained.

The mounting member 1 may be formed of invar (Fe: 64%, Ni: 36%) having a coefficient of thermal expansion of $2 \times 10^{-6}/°C$. or less at a temperature ranging between 30° and 100° C., or super invar (Fe: 63%, Ni: 32%, Co: 5%) having a coefficient of thermal expansion of $1.3 \times 10^{-6}/°C$. or less at a temperature ranging between 30° and 100° C.

The adhesive 52 is used when the end 2a of the piezoelectric element 2 and the conductor retaining member 8 are mounted on the mounting member 1 and when the shielding means 7 is provided in the through-hole 1a in the mounting member 1 and the through-hole 8a in the conductor retaining member 8.

For this reason, the cylindrical piezoelectric element 2 is expanded and contracted or curved with the other end 2b serving as a free end and the end 2a acting as a fixed end. Generally, in an STM capable of observing the surface of the sample on an atomic scale, the probe 5 is moved in each of the X, Y, and Z axes by 1 μm at a maximum. Therefore, the flexibility of the above-described conductor 6 and the shielding means 7 allows the forward end of the probe 5 provided at the free end side of the piezoelectric element 2 to be moved three-dimensionally to a sufficient extent.

Figure 6:
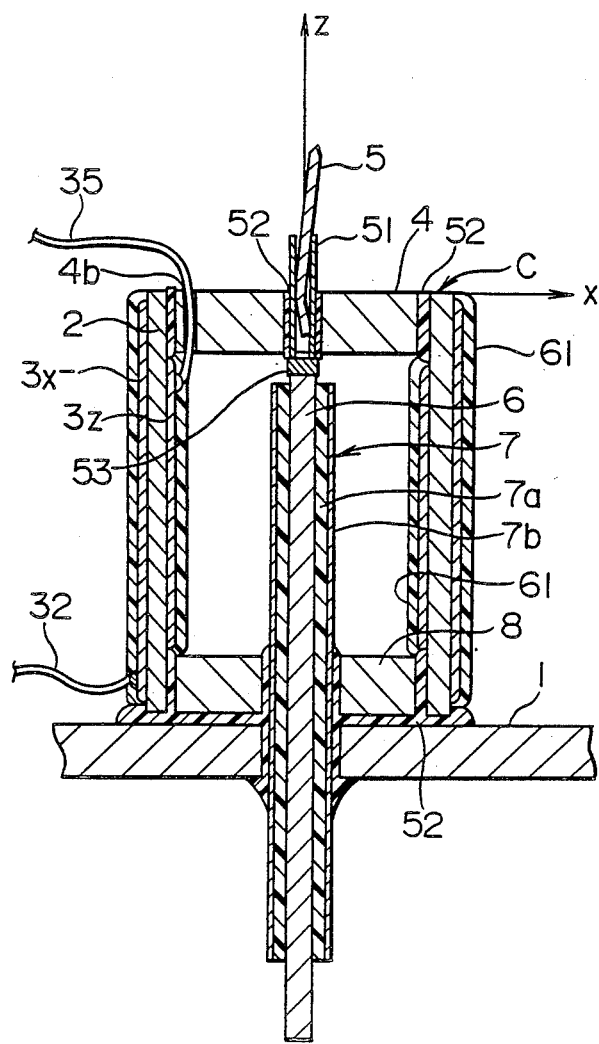
FIG. 6 is a cross-sectional view of a third embodiment of the present invention.

A third embodiment of the present invention will be described below with reference to FIG. 6.

In the third embodiment, the electrode 3 provided on the surfaces of the piezoelectric element 2 is coated with an insulating film 61 having a thickness of 3 to 5 μm. The insulating film 61 may be made of an insulator having a small dielectric power factor (which is $20 \times 10^{-4}$ or less at a frequency of $10^6$ to $10^7$ Hz), a high heat resistance (288° C.) and a high specific resistivity ($10^{18}$ Ωcm or above), such as polytetrafluoroethylene. The insulating film 61 is also coated on the spacings between the four electrodes $3x+$, $3x-$, $3y+$, and $3y-$ provided on the outer periphery of the piezoelectric element 2, by which the e;ectrpdes are shielded by the piezoelectric element 2 and the insulating film 61 from the atmosphere surrounding the fine adjustment mechanism.

As a result, when the fine adjustment mechanism of the third embodiment is used in the atmosphere, occurrance of current leakage between the electrodes due to the moisture in the atmosphere can be prevented.

Figure 7:
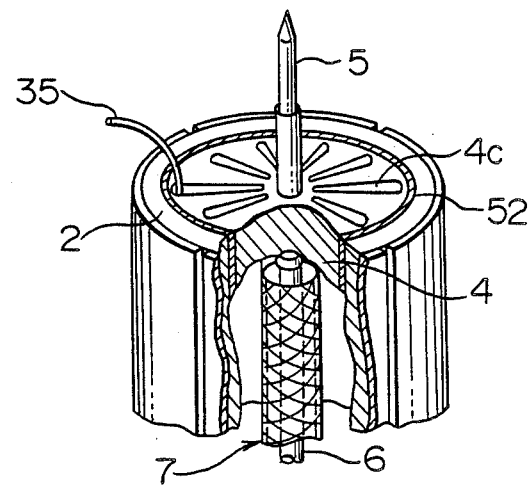
FIG. 7 is a perspective view of essential parts of a modified example of the third embodiment.

Further, if the insulator 7a of the shielding means 7 is also made of an insulator such as polytetrafluoroethylene having a small dielectric power factor, a high heat resistance, and a high specific resistivity, like the insulating film 61, gas in the cylinder C may be easily emitted by heating, making the thus-arranged fine adjustment mechanism suitable for use in a vacuum. In that case, if the disk-shaped probe retaining member 4 is provided with a vent hole, gas within the cylinder C can be emitted therethrough. The vent hole may be a plurality of radially formed slits 4c such as those shown in FIG. 7. At that time, it is not necessary for the through-hole 4b to be formed in the probe retaining member 4 so as to pass the lead wire 35 therethrough but the lead wire 35 is passed through one of the slits 4c. The shape of the vent hole is not limited to the slits but it may also be a large number of through-holes having a circular cross section.

Figure 8:
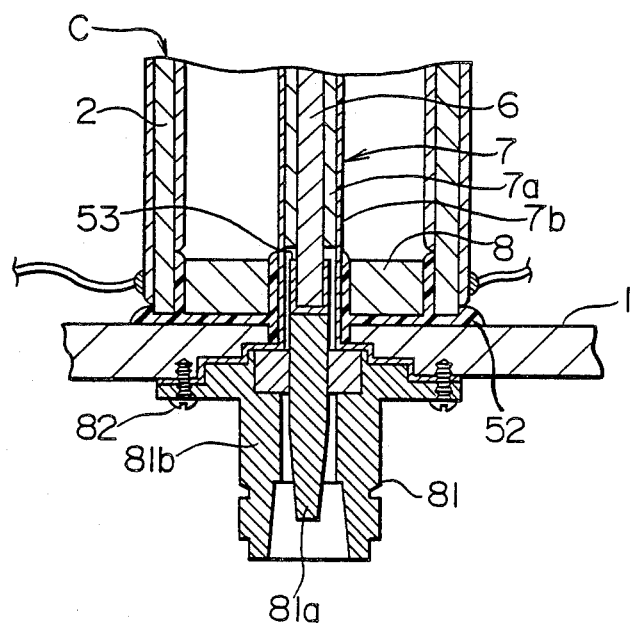
FIG. 8 is a cross-sectional view of essential parts of a fine adjustment mechanism, showing a fourh embodiment of the present invention.

As shown in FIG. 8, a female portion 81 of a high-frequency coaxial connector may be fixed to the mounting member 1 by screws 82. The female portion 81 of the connector is disposed in such a manner that its central axis is aligned with the central axis (Z axis) of the cylinder C. The end of the conductor 6 is electrically connected to a central conductor 81a of the female portion 81 by the solder 53. The external conductor 7b of the shielding means 7 is extended and is held between the mounting member 1 and a shell portion 81b of the female portion 81, by which the external conductor 7b is electrically connected to the shell portion 81b of the female portion 81. Electrical connection of the external conductor 7b with the shell portion 81b may also be conducted using solder.

If a male portion of the coaxial connector is connected to an external circuit such as a differential amplifier while the female portion 81 of the coaxial connector is mounted on the mounting member 1, the fine adjustment mechanism can be simply and securely connected to the external circuit. It is preferable for the coaxial connector to be used to have the same characteristic impedance as that of the shielding means 7. It is also to be noted that the male portion of the high-frequency coaxial connector may be fixed to the mounting member 1 in place of the female portion 81 thereof, the male portion being connected to the conductor 6 and the external conductor 7b.

Figure 9:
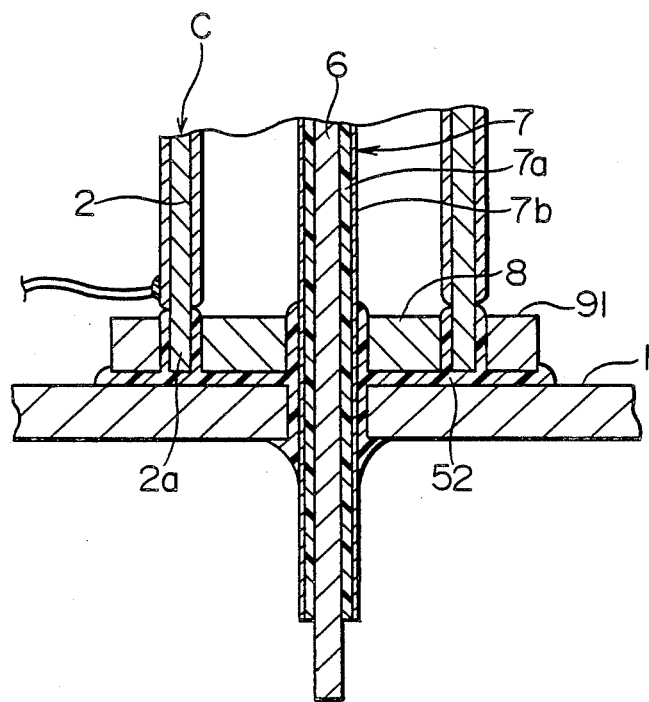
FIG. 9 is a cross-sectional view of essential parts of a fine adjustment mechanism, showing a fifth embodiment of the present invention.

As shown in FIG. 9, a fixing ring 91 may be provided on the outer periphery of the end 2a of the piezoelectric element 2 fixed to the mounting member 1 by the adhesive 52 so as to make the cylinder C fixed to the mounting member 1 more firmly. The fixing ring 91 is an annular ring which has the same thickness as that of the conductor retaining member 8, and which is formed of a material having a small coefficient of thermal expansion such as invar or super invar. It is fixed to the outer periphery of the end 2a of the piezoelectric element 2 and to the mounting member 1 by the adhesive 52.

What is claimed is:

1. A fine adjustment mechanism for use in a scanning tunneling microscope, comprising:
    a mounting member;
    a cylindrical piezoelectric element fixed to said mounting member at one end thereof;
    an electrode means provided on each of the inner and outer walls of said piezoelectric element;
    a probe provided on the other end of said piezoelectric element in such a manner that said probe extends outwardly on the central axis of said piezoelectric element;
    an electrically conductive member provided on the central axis of said piezoelectric element, one end of said conductive member being electrically connected to said probe within said piezoelectric element and the other end thereof extending to the outside of said piezoelectric element through the side of said piezoelectric element at which said piezoelectric element is fixed to said mounting member; and
    a shielding means provided on the outer periphery of said conductive means for electrically shielding said conductive means.

2. A fine adjustment mechanism according to claim 1, wherein said shielding means comprises an insulator provided on the outer periphery of said conductor in such a manner as to surround said conductor, and an external conductor provided on the outer periphery of said insulator in such a manner as to surround said insulator.

3. A fine adjustment mechanism according to claim 2, wherein said external conductor is grounded.

4. A fine adjustment mechanism according to claim 1, wherein said conductive member comprises a conductor electrically connected to said probe at one end thereof, and a connector fixed to said mounting member and electrically connected to the other end of said conductor.

5. A fine adjustment mechanism according to claim 4, wherein said shielding means comprises an insulator provided on the outer periphery of said conductor in such a manner as to surround said conductor, and an external conductor provided on the outer periphery of said insulator in such a manner as to surround said insulator.

6. A fine adjustment mechanism according to claim 5, wherein said external conductor is grounded.

7. A fine adjustment mechanism according to claim 4, wherein said connector is a high-frequency coaxial connector.

8. A fine adjustment mechanism according to claim 1, further comprising a disk-shaped probe retaining member fitted to the other end of said piezoelectric element for retaining said probe.

9. A fine adjustment mechanism according to claim 8, further comprising a small tube inserted in a throughhole which is provided in said probe retaining member on the central axis of said piezoelectric element, said probe being inserted in said small tube.

10. A fine adjustment mechanism according to claim 9, wherein said small tube is made of a conducdive material, and is electrically connected to said conductive member.

11. A fine adjustment mechanism according to claim 9, wherein said probe retaining member is provided with a vent hole which passes therethrough.

12. A fine adjustment mechanism according to claim 1, further comprising an insulating film formed on the surface of said electrode.

13. A fine adjustment mechanism according to claim 1, further comprising ah internally fixed member being provided on the inner side of the end of said piezoelectric element at which said piezoelectric element is fixed to said mounting member in such a manner that said internally fixed member is fixed to both said piezoelectric element and said mounting member.

14. A fine adjustment mechanism according to claim 1, further comprising an externally fixed member being provided on the oufer side of the end of said piezoelectric element at which said piezoelectric element is fixed t0 said mounting member in such a manner that said externally fixed member is fixed to both said piezoelectric element and said mounting member.

* * * * *